(12) United States Patent
Hsu

(10) Patent No.: US 12,179,872 B2
(45) Date of Patent: Dec. 31, 2024

(54) DEVICE FOR ADJUSTING SEAT HEIGHT

(71) Applicant: Jung-Yu Hsu, Tainan (TW)

(72) Inventor: Jung-Yu Hsu, Tainan (TW)

( * ) Notice: Subject to any disclaimer, the term of this patent is extended or adjusted under 35 U.S.C. 154(b) by 197 days.

(21) Appl. No.: 17/980,637

(22) Filed: Nov. 4, 2022

(65) Prior Publication Data

US 2023/0348003 A1  Nov. 2, 2023

(30) Foreign Application Priority Data

Apr. 27, 2022 (TW) ................................ 111204335

(51) Int. Cl.
*B62J 1/08* (2006.01)

(52) U.S. Cl.
CPC ............ *B62J 1/08* (2013.01); *B62J 2001/085* (2013.01)

(58) Field of Classification Search
CPC .................................................. B62J 2001/085
USPC ........................................ 297/215.13, 215.14
See application file for complete search history.

(56) References Cited

U.S. PATENT DOCUMENTS

| | | | | |
|---|---|---|---|---|
| 7,025,522 B2 * | 4/2006 | Sicz | ........................ | B62K 19/36 403/379.5 |
| 8,177,251 B2 * | 5/2012 | Shirai | ........................ | B62J 1/08 280/288.4 |
| 8,328,454 B2 * | 12/2012 | McAndrews | .......... | B62K 25/08 297/215.13 |
| 8,398,104 B2 * | 3/2013 | Hsu | ........................... | B62J 1/08 280/220 |
| 8,641,073 B2 * | 2/2014 | Lee | ......................... | B62K 19/36 280/288.4 |
| 9,616,953 B2 * | 4/2017 | Tsai | ....................... | B62K 19/36 |
| 2009/0146471 A1 * | 6/2009 | Biro | ........................... | B62J 1/08 297/215.13 |
| 2011/0181082 A1 * | 7/2011 | Chang | ........................ | B62J 1/08 297/215.13 |
| 2012/0104809 A1 * | 5/2012 | Hsu | ........................... | B62J 1/08 297/215.13 |
| 2013/0221713 A1 * | 8/2013 | Pelot | ...................... | G05B 15/02 297/215.13 |
| 2014/0021753 A1 * | 1/2014 | Chien | ........................ | B62J 1/08 297/215.13 |
| 2016/0304146 A1 * | 10/2016 | Teixeira | ..................... | B62J 1/06 |

FOREIGN PATENT DOCUMENTS

TW   201801976 A  †  1/2018

\* cited by examiner
† cited by third party

*Primary Examiner* — Jose V Chen
(74) *Attorney, Agent, or Firm* — Best & Flanagan LLP

(57) ABSTRACT

A device for adjusting a seat height includes a fixation seat, an outer tube, an inner tube received in the outer tube, a cylinder housed in the inner tube, and a piston rod accommodated in the cylinder and combined with the inner tube. The fixation seat is attached to a bicycle seat. The outer tube is adapted to be connected with a bicycle frame. The piston rod can be displaced relative to the cylinder, so that the inner tube is driven by the piston rod to move relative to the outer tube within a displacement stroke, so as to adjust the height of the bicycle seat. In addition, the inner tube can be displaced relative to the piston rod by the rotation of the piston rod, so that the rider can adjust the bicycle seat height according to his own height or specific needs.

6 Claims, 5 Drawing Sheets

DEVICE FOR ADJUSTING SEAT HEIGHT

BACKGROUND OF THE INVENTION

1. Field of the Invention

The present invention relates to a device for adjusting a seat height and, more particularly, to a height adjustment device for bicycle seats.

2. Description of the Related Art

In order to meet the requirements of riders of different heights, a bicycle seat should be adjustable in height. The conventional height adjustment device for bicycle seats generally includes a fixation seat connected to a bicycle seat, an outer tube connected to a bicycle frame, an inner tube inside the outer tube, and a telescopic rod provided between the outer tube and the inner tube. The telescopic rod includes a cylinder housed in the inner tube and a piston rod accommodated in the cylinder and movable relative to the cylinder. The upper portion of the inner tube is connected to the fixation seat. To adjust the seat height, the piston rod is moved relative to the cylinder with a handle or a wired control unit, so that the seat height can be adjusted or fixed.

When a telescopic rod is installed on the bicycle frame, the height adjustment stroke of the bicycle seat is fixed because the upper end of the piston rod or the top end of the cylinder is combined with the inner tube. Therefore, when the piston rod moves to the maximum stroke position relative to the cylinder, the height of the bicycle seat cannot be raised any more, resulting in the rider's height being limited by the telescopic stroke of the piston rod. In order to allow the height of the bicycle seat to have a variety of maximum adjustment strokes to meet the needs of different heights of the riders, the telescopic rods must be manufactured in different sizes with different telescopic strokes, causing trouble in production. In order to improve the problem that the height adjustment distance of the bicycle seat is limited by the telescopic stroke of the piston rod, an adjustment unit is arranged between the inner tube and the telescopic rod, so that the inner tube can be displaced relative to the cylinder of the telescopic rod. However, this conventional technique has disadvantages of troublesome manufacturing, complicated structure, and laborious operation.

BRIEF SUMMARY OF THE INVENTION

An objective of the present invention is to provide a device for adjusting a seat height, which is suitable for adjusting the seat heights of a bicycle and can utilize the rotation of the piston rod to displace the inner tube relative to the piston rod to adjust the displacement stroke of the bicycle seat. Thus, a single size of the telescopic rod can be used for riders of different heights or specific needs, and the device for adjusting a seat height has the effect of simple structure and labor-saving operation.

To achieve this and other objectives, a device for adjusting a seat height of the present invention includes an outer tube, an inner tube, a cylinder, and a piston rod. The outer tube is adapted to be connected with a bicycle frame and includes upper and lower ends spaced in a longitudinal direction. The inner tube is received in the outer tube and movable relative to the outer tube in the longitudinal direction. The inner tube includes an upper portion extending out of the upper end of the outer tube and adapted to be connected to a bicycle seat. The inner tube has an inner hole therein. A connecting portion is provided in the inner tube adjacent to the upper portion and provided with a screw hole extending in the longitudinal direction and communicating with the inner hole. The cylinder is received in the inner hole of the inner tube and includes first and second ends spaced in the longitudinal direction. The first end is adjacent the lower end of the outer tube. The piston rod is received in the cylinder and movable relative to the cylinder in the longitudinal direction. One end of the piston rod extends out of the second end of the cylinder and has a screw portion. The screw portion is screwed in the screw hole of the connecting portion and has a head end which passes through the screw hole. When the piston rod is rotated through the head end, the inner tube is driven to move in the longitudinal direction relative to the piston rod.

In an embodiment, the length of the screw portion in the longitudinal direction is greater than the length of the screw hole in the longitudinal direction.

In an embodiment, a top end of the screw hole has an enlarged portion with a hole diameter larger than a hole diameter of the screw hole. The head end has a bottom portion provided with a stopper having an outer diameter larger than the hole diameter of the screw hole. When the inner tube is moved relative to the piston rod until the head end of the screw portion abuts against the connecting portion, the stopper is located in the enlarged portion to form an upper positioning point.

In an embodiment, the stopper is a retaining ring.

In an embodiment, a nut is provided in the inner tube to form the connecting portion.

In an embodiment, an operation hole is formed in the upper portion, and the screw hole communicates the operation hole with the inner hole. The operation hole has a hole diameter larger than a hole diameter of the screw hole, and the head end of the screw portion is located in the operation hole.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
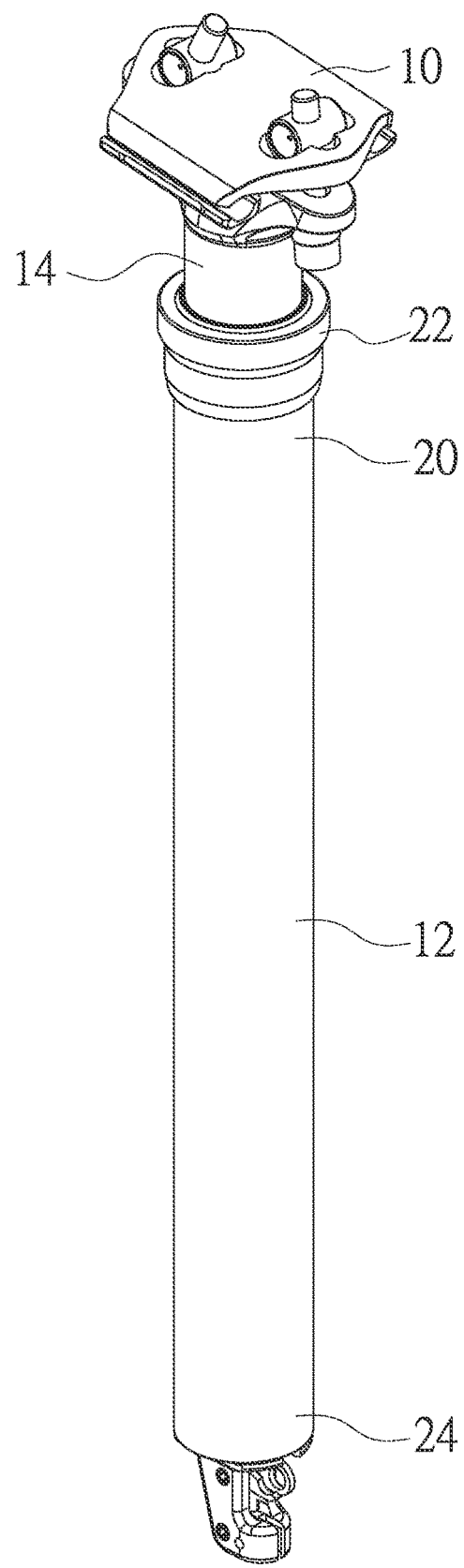
FIG. 1 is a perspective view of a device for adjusting a seat height of an embodiment according to the present invention.
Figure 2:
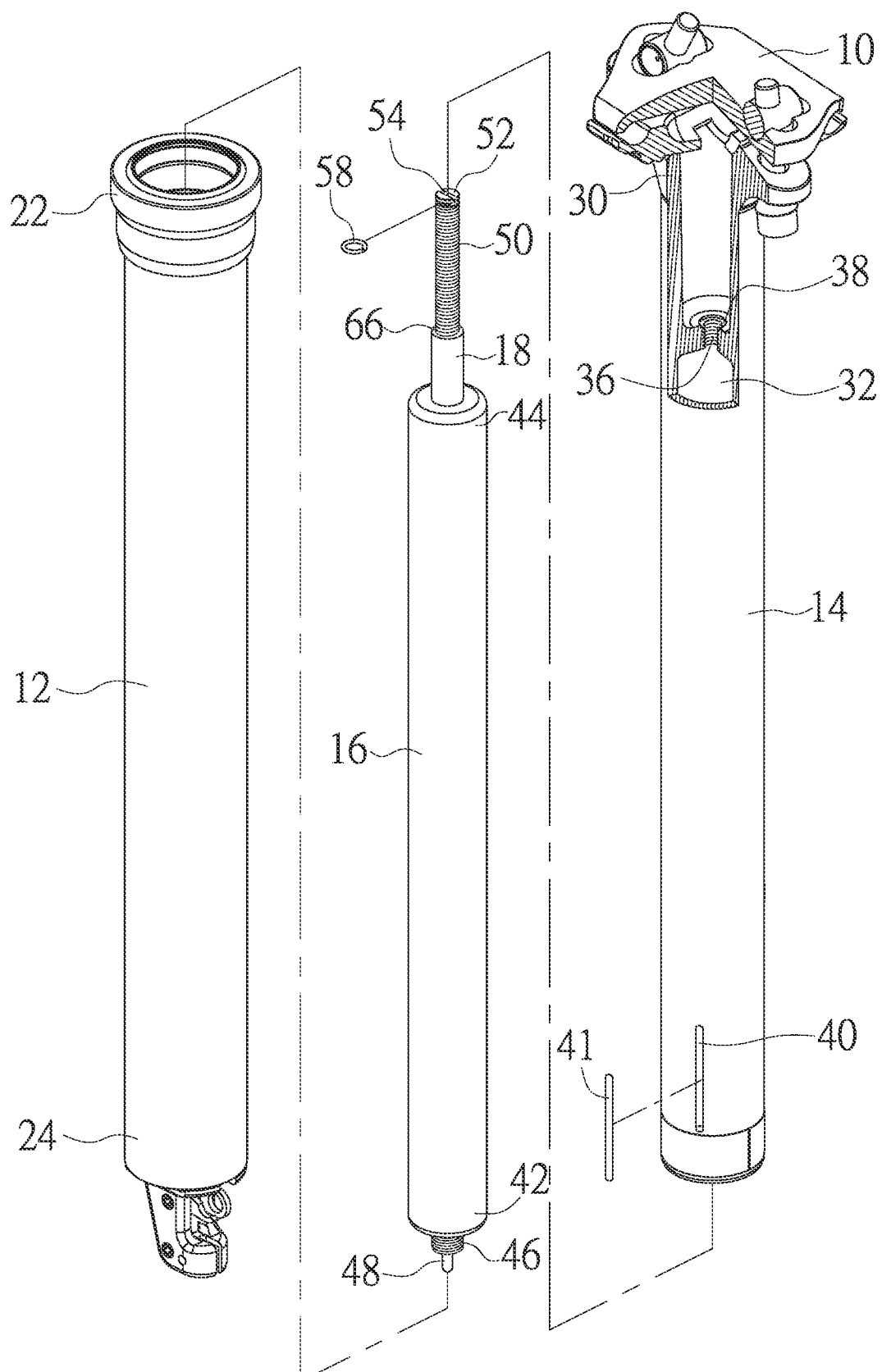
FIG. 2 is an exploded, perspective view of the device for adjusting a seat height of FIG. 1.
Figure 3:
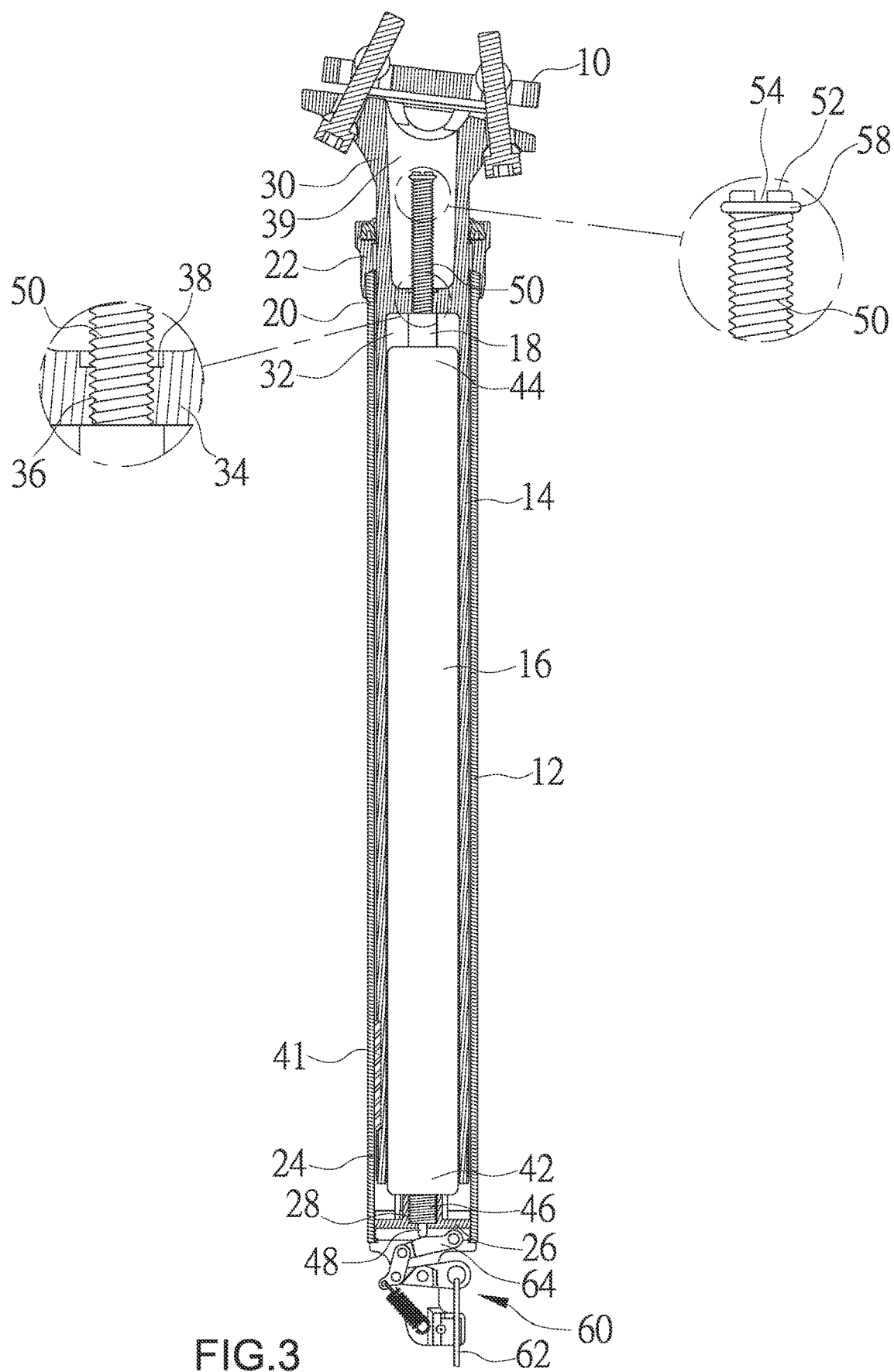
FIG. 3 is a cross sectional view of the device for adjusting a seat height of FIG. 1.

With reference to FIGS. 1-3, a device for adjusting a seat height according to an embodiment of the present invention includes a fixation seat 10, an outer tube 12, an inner tube 14 received in the outer tube 12, a cylinder 16 housed in the inner tube 14, and a piston rod 18 housed in the cylinder 16. The fixation seat 10 is attached to a bottom of a bicycle seat (not shown). The outer tube 12 is adapted to be connected with a bicycle frame (not shown). A cover 22 is arranged around an upper end 20 of the outer tube 12, and a positioning seat 26 is arranged inside a lower end 24 of the outer tube 12 and provided with a positioning hole 28.

Figure 4:
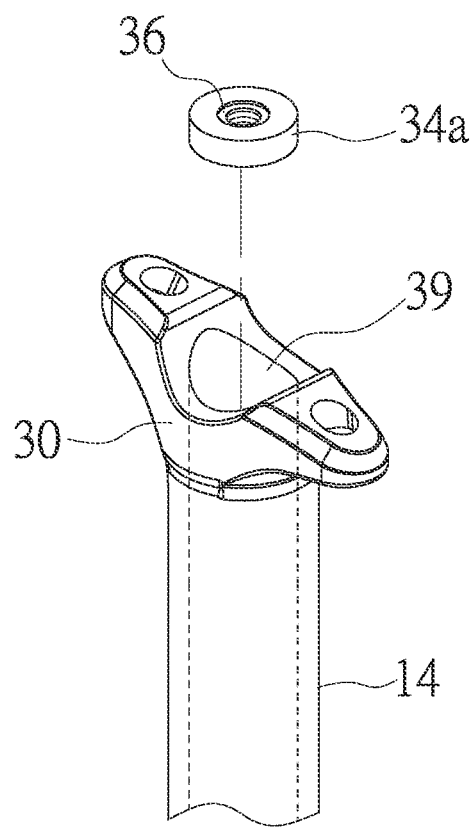
FIG. 4 is a schematic view illustrating that a nut is provided in an inner tube of FIG. 2 to form a connecting portion.

The inner tube 14 includes an upper portion 30 extending out of the upper end 20 of the outer tube 12 and connected to the fixation seat 10. The inner tube 14 is movable relative to the outer tube 12 in a longitudinal direction, so that the bicycle seat can be moved together with the inner tube 14. In this embodiment, the upper portion 30 of the inner tube 14 is integrally formed with the inner tube 14. In a workable embodiment, the upper portion 30 of the inner tube 14 is formed by a component that is detachably combined with the inner tube 14. The inner tube 14 has an inner hole 32 therein, and a connecting portion 34 is provided in the inner tube 14 adjacent to the upper portion 30 (FIG. 3). The connecting portion 34 is provided with a screw hole 36 extending in the longitudinal direction and communicating with the inner hole 32. A top end of the screw hole 36 has an enlarged portion 38 with a hoe diameter larger than that of the screw hole 36. An operation hole 39 is formed in the upper portion 30, and the screw hole 36 communicates the operation hole 39 with the inner hole 32. The hole diameter of the operation hole 39 is larger than that of the screw hole 36 and approximately equal to the hole diameter of the inner hole 32. In this embodiment, the connecting portion 34 is integrally provided in the inner tube 14. In a workable embodiment, a nut 34a having a screw hole 36 is integrally engaged or tightly fitted in the inner tube 14 to form the connecting portion 34 (FIG. 4). A plurality of recesses 40 is provided around the bottom of the inner tube 14 (FIG. 2), and each recess 40 accommodates a rod body 41, so that the inner tube 14 cannot be rotated relative to the outer tube 12.

The cylinder 16 is housed within the inner hole 32 of the inner tube 14 and includes first and second ends 42 and 44 spaced in the longitudinal direction. The first end 42 is adjacent the lower end 24 of the outer tube 12. The cylinder 16 may be either a pneumatic or hydraulic cylinder, and its interior is provided with a channel for gas or liquid flow (not shown). The first end 42 of the cylinder 16 is provided with a screw pin 46 and a push rod 48. In this embodiment, the screw pin 46 is engaged in the positioning hole 28 of the outer tube 12, so that the first end 42 of the cylinder 16 is fixed with the outer tube 12. One end of the push rod 48 passes through the screw pin 46 and extends out of the positioning seat 26.

One end of the piston rod 18 extends out of the second end 44 of the cylinder 16 and has a screw portion 50. The screw portion 50 is screwed into the screw hole 36 of the connecting portion 34 and has a head end 52 which passes through the screw hole 36 and is located in the operation hole 39. The head end 52 includes an upper surface having an operating portion 54 such as a socket for insertion of a tool 56 such as a screwdriver to rotate the piston rod 18 (FIG. 5B). In this embodiment, the length of the screw portion 50 in the longitudinal direction is greater than the length of the screw hole 36 in the longitudinal direction. The bottom portion of the head end 52 is provided with a stopper 58 with a larger outer diameter. In this embodiment, the stopper 58 is a retaining ring combined with the screw portion 50, and the outer diameter of the stopper 58 is larger than the hole diameter of the screw hole 36 but slightly smaller than the hole diameter of the enlarged portion 38.

Figure 5A:
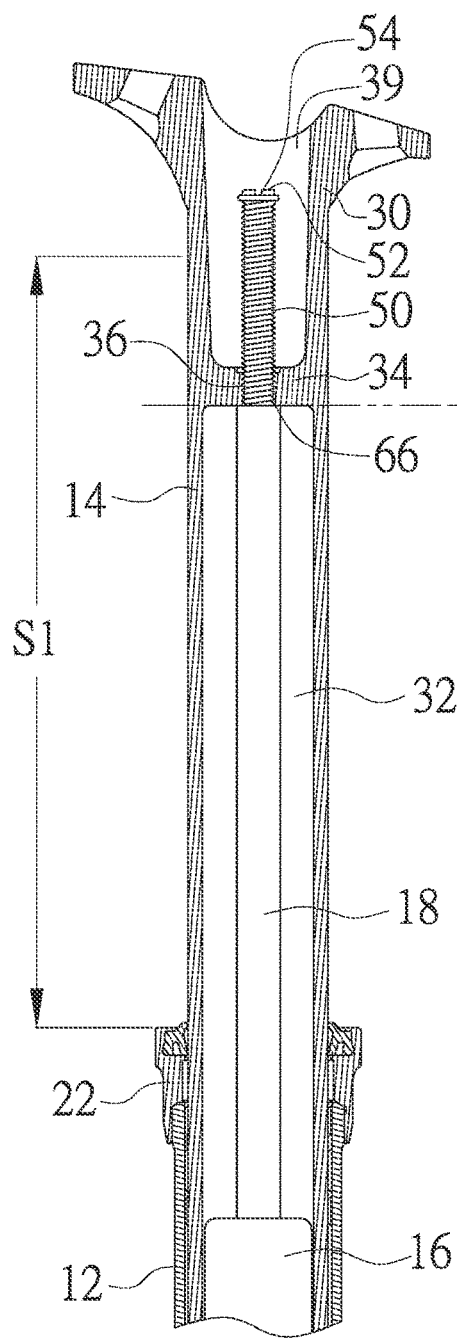
FIG. 5A shows a schematic view of a piston rod in FIG. 3 moved to a maximum stroke.
Figure 5B:
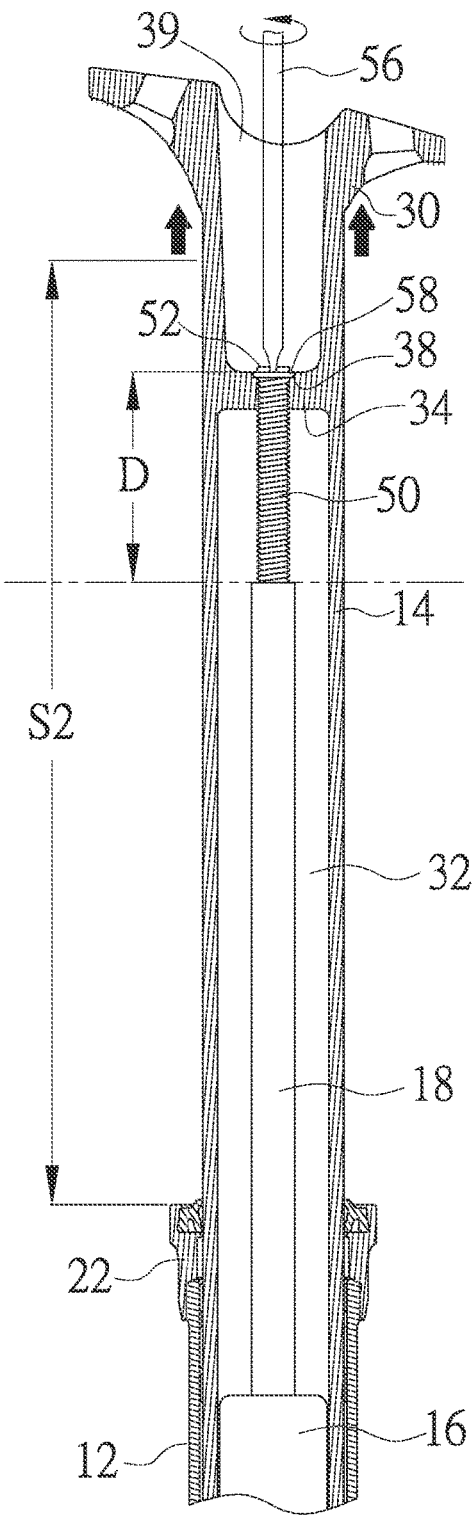
FIG. 5B shows a schematic view of rotating the piston rod of FIG. 5A to move the inner tube relative to the piston rod to a higher position.

The piston rod 18 is movable relative to the cylinder 16 in the longitudinal direction, so that the inner tube 14 can be driven by the piston rod 18 to move relative to the outer tube 12 within a first displacement stroke S1 (FIG. 5A). FIG. 3 shows the piston rod 18 retracted to a lowest point position, while FIG. 5A shows the piston rod 18 extending outward to a highest point position, so that the upper portion 30 of the inner tube 14 has a maximum extension relative to the outer tube 12. Since the technical content of the displacement of the piston rod 18 in relation to the cylinder 16 is not a technical feature of the present invention, the internal structure of the cylinder 16 will not be described in detail here. The push rod 48 is operatively connected to a wired control unit 60 which is of a conventional construction consisting of a knob (not shown) attached to the handlebar of a bicycle, a steel cable 62 operatively connected to the knob, and a drive member 64 abutting against the push rod 48. Once the knob is operated to pull the steel cable 62, the drive member 64 pivots to move the push rod 48, so that the gas channel or the liquid channel inside the cylinder 16 is opened, thus, the piston rod 18 can be raised or lowered relative to the cylinder 16 to adjust the height of the bicycle seat.

Since the screw portion 50 of the piston rod 18 is screwed into and extends through the screw hole 36 of the inner tube 14, when the piston rod 18 is rotated, the inner tube 14 is driven to move in the longitudinal direction relative to the piston rod 18 within a displacement distance D (FIG. 5B). FIG. 5A shows that a bottom end 66 of the screw portion 50 abuts against the connecting portion 34 to form a lower positioning point, and FIG. 5B shows that the head end 52 of the screw portion 50 abuts against the connecting portion 34, and the stopper 58 is located in the enlarged portion 38 to form an upper positioning point. Furthermore, FIG. 5B shows that the inner tube 14 can be moved relative to the outer tube 12 within a second displacement stroke S2.

Accordingly, with respect to adjusting the height of the bicycle seat, the user can first rotate the piston rod 18 with the tool 56 to position the inner tube 14 in an appropriate position relative to the piston rod 18. The displacement stroke of the inner tube 14 relative to the outer tube 12 can thus be adjusted between the first displacement stroke S1 and the second displacement stroke S2, so that a single size piston rod 18 can be used by riders of different heights or specific needs.

The device for adjusting a seat height of the present invention has the following advantages:

1. The seat height adjustment device of the present invention saves a separate adjustment unit between the inner tube and the telescopic rod and thus offers the advantages of convenient manufacture and simplified construction.

2. The cross-sectional area of the piston rod 18 is smaller than that of the cylinder 16, so the operation of rotating the piston rod 18 to move the inner tube 14 has the advantage of saving labor. In addition, the length of the screw portion 50 can be set to be longer, which is beneficial to increase the displacement distance D of the inner tube 14 relative to the outer tube 12.

3. In the operation of rotating the piston rod 18, the upper positioning point and the lower positioning point can be formed by the head end 52 and the bottom end 66 of the screw portion 50 respectively abutting against the connecting portion 34, so that the screw portion 50 and the inner tube 14 will not be separated.

4. In addition to the displacement of the piston rod 18 relative to the cylinder 16 in the longitudinal direction to make the inner tube 14 move relative to the outer tube 12, the piston rod 18 can also be rotated to make the inner tube 14 move relative to the piston rod 18 in the longitudinal direction under the cooperative operation of its screw portion 50 and the screw hole 36, so that the piston rod 18 can perform a variety of functions.

The scope of the present disclosure is to be indicated by the appended claims, rather than by the foregoing description, and all changes which come within the meaning and range of equivalency of the claims are intended to be embraced therein.

The invention claimed is:

1. A device for adjusting a seat height comprising:
an outer tube adapted to be connected with a bicycle frame and including upper and lower ends spaced in a longitudinal direction;
an inner tube received in the outer tube and being movable relative to the outer tube in the longitudinal direction, with the inner tube including an upper portion extending out of the upper end of the outer tube and adapted to be connected to a bicycle seat, with a connecting portion fixedly provided in the inner tube adjacent to the upper portion and provided with a screw hole extending therethrough in the longitudinal direction;
a cylinder received in the inner tube and including first and second ends spaced in the longitudinal direction, with the first end being adjacent the lower end of the outer tube; and
a piston rod received in the cylinder and being movable relative to the cylinder in the longitudinal direction, with one end of the piston rod extending out of the second end of the cylinder and having a screw portion thereon, wherein the screw portion is screwed in the screw hole of the connecting portion and has a head end which passes through the screw hole, wherein the inner tube is movable in the longitudinal direction relative to the piston rod by rotating the head end of the piston rod.

2. The device for adjusting a seat height as claimed in claim 1, wherein a length of the screw portion in the longitudinal direction is greater than a length of the screw hole in the longitudinal direction.

3. The device for adjusting a seat height as claimed in claim 1, wherein the screw hole includes a top end having an enlarged portion with a hole diameter larger than a hole diameter of the screw hole, wherein the head end has a bottom portion provided with a stopper with an outer diameter larger than the hole diameter of the screw hole, wherein when the inner tube is moved relative to the piston rod until the head end of the screw portion abuts against the connecting portion, the stopper is located in the enlarged portion to form an upper positioning point.

4. The device for adjusting a seat height as claimed in claim 3, wherein the stopper is a retaining ring.

5. The device for adjusting a seat height as claimed in claim 1, wherein a nut is provided in the inner tube to form the connecting portion.

6. The device for adjusting a seat height as claimed in claim 1, wherein an operation hole is formed in the upper portion of the inner tube, and the screw hole communicates with the operation hole, with the operation hole having a hole diameter larger than a hole diameter of the screw hole, with the head end of the screw portion located in the operation hole.

* * * * *